United States Patent
Sugahara et al.

(10) Patent No.: US 8,492,679 B2
(45) Date of Patent: Jul. 23, 2013

(54) FLUX-CORED WIRE FOR STAINLESS STEEL ARC WELDING

(75) Inventors: Hiroshi Sugahara, Fujisawa (JP);
Tetsunao Ikeda, Fujisawa (JP);
Hirohisa Watanabe, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 102 days.

(21) Appl. No.: 12/955,393

(22) Filed: Nov. 29, 2010

(65) Prior Publication Data

US 2011/0139761 A1 Jun. 16, 2011

(30) Foreign Application Priority Data

Dec. 15, 2009 (JP) ................................. 2009-284601

(51) Int. Cl.
*B23K 35/362* (2006.01)

(52) U.S. Cl.
USPC ..................................... 219/145.22; 156/325

(58) Field of Classification Search
USPC ..................................... 156/325; 219/145.22
See application file for complete search history.

(56) References Cited

U.S. PATENT DOCUMENTS

| | | | |
|---|---|---|---|
| 5,861,605 A | 1/1999 | Ogawa et al. | |
| 5,914,061 A * | 6/1999 | Ogawa et al. | 219/145.22 |
| 6,340,396 B1 | 1/2002 | Ogawa et al. | |
| 8,153,935 B2 | 4/2012 | Jang et al. | |
| 2008/0093352 A1 * | 4/2008 | Jang et al. | 219/145.22 |
| 2009/0261085 A1 | 10/2009 | Suzuki et al. | |

FOREIGN PATENT DOCUMENTS

| | | |
|---|---|---|
| EP | 1 008 417 A1 | 6/2000 |
| EP | 2 110 195 A2 | 10/2009 |
| JP | 1-233094 | 9/1989 |
| JP | 2008-221292 | 9/2008 |

OTHER PUBLICATIONS

Extended European Search Report issued Mar. 15, 2011, in Patent Application No. 10015244.6.
U.S. Appl. No. 12/983,486, filed Jan. 3, 2011, Ikeda, et al.
U.S. Appl. No. 13/342,461, filed Jan. 3, 2012, Sugahara, et al.

* cited by examiner

*Primary Examiner* — Katarzyna Wyrozebski Lee
*Assistant Examiner* — Daniel Lee
(74) *Attorney, Agent, or Firm* — Oblon, Spivak, McClelland, Maier & Neustadt, L.L.P.

(57) ABSTRACT

A flux-cored wire for stainless steel arc welding including an outer sheath made of stainless steel and flux filled up in the outer sheath contains, as percentage to the total mass of the wire, Cr: 22.0-30.0 mass %, Ni: 6.0-12.0 mass %, Mo: 2.0-5.0 mass %, N: 0.20-0.35 mass %, $TiO_2$: 4.0-9.0 mass %, $SiO_2$: 0.1-2.0 mass %, $ZrO_2$: 0.5-4.0 mass %, total of $Li_2O$, $Na_2O$ and $K_2O$: 0.50-1.50 mass %, metal fluoride in terms of fluorine amount: 0.10-0.90 mass %, and rare earth element component: 0.10-1.00 mass %, limits C to 0.04 mass % or below, W to 4.0 mass % or below, Cu to 2.0 mass % or below, $Bi_2O_3$ to 0.01 mass % or below, and limits oxides other than the above to 3.0 mass % or below. With such a composition, it is possible to obtain a weld bead which is excellent in the weldability in welding in all attitudes and is more excellent in the low temperature toughness while keeping excellent pitting corrosion resistance in arc welding of duplex stainless steel and the like.

10 Claims, 1 Drawing Sheet

FLUX-CORED WIRE FOR STAINLESS STEEL ARC WELDING

BACKGROUND OF THE INVENTION

1. Field of the Invention

The present invention relates to a flux-cored wire for stainless steel arc welding used for arc welding of duplex stainless steel and the like with austenitic phase and ferritic phase, and relates specifically to a flux-cored wire for stainless steel arc welding excellent in the pitting corrosion resistance and the low temperature toughness as well as excellent in weldability of welding in all attitudes.

2. Description of the Related Art

With respect to a member for a structure of chemical plant equipment, oil well pipe for excavation of petroleum or natural gas, line pipe, chemical tanker, water gate and the like, excellent stress corrosion crack (SCC) resistance and pitting corrosion resistance as well as high strength in an environment including mainly chlorine ion of sea water and the like have been conventionally required. For a member satisfying these requirements, duplex stainless steel of JIS SUS329J3L, SUS 329J4L and ASTM S31803 and the like, for example, have been used.

For welding a member of these structures, welding material with an alloy composition similar to that of a base metal is commonly used basically. Accordingly, similar to the base metal, alloy composition of the welding material is diversified. Further, various kinds of welding methods are employed, and arc welding using highly efficient and easily usable flux-cored wire is widely employed in particular.

However, the duplex stainless steel is subjected to heat treatment after rolling in the manufacturing process, and the structure of the duplex stainless steel is stabilized to a structure close to an equilibrium state at the heat treatment temperature. On the other hand, the weld metal is of comparatively unstable structure of a non-equilibrium state in which an austenitic phase is precipitated in a ferritic phase in a natural cooling step after solidification in a single ferritic phase. Accordingly, in the weld bead of the duplex stainless steel, a plane unstable in the pitting corrosion resistance or the low temperature toughness when compared with the steel exists, deterioration of the pitting corrosion resistance and/or the low temperature toughness becomes a problem in some structures employing the same, and therefore improvement of the welding material is desired for.

As the technology for improving the pitting corrosion resistance of the weld bead in arc welding using a flux-cored wire, U.S. Published Patent Application No. 2008/0093352 and Japanese Published Unexamined Patent Application No. 2008-221292 can be exemplarily cited. These patent documents disclose the technology for improving the pitting corrosion resistance of the weld bead by adding Cr, Mo and N to the flux-cored wire. Also, it is disclosed that the strength of the weld metal is improved by adding N to the flux-cored wire.

However, the conventional technologies described above include the following problems. In recent years, because the structural material such as the duplex stainless steel has come to be used in a high pressure and low temperature environment including the chlorine ion of the submarine trench, seabed and the like for example, higher pitting corrosion resistance and low temperature toughness have been required for the weld bead. However, the conventional flux-cored wire described above has not coped with the requirements in recent years on the pitting corrosion resistance and the low temperature toughness.

Also, with regard to the flux-cored wire described in U.S. Published Patent Application No. 2008/0093352, the content of the alkaline metal composition is low, the arc stability cannot be secured and the weldability deteriorates particularly in vertical upward welding.

Further, with regard to the flux-cored wire for welding duplex stainless steel described in Japanese Published Unexamined Patent Application No. 2008-221292, the $ZrO_2$ content is low and excellent slag encapsulating performance cannot be secured particularly in vertical welding and overhead welding, thereby the slag removability and the porosity resistance deteriorate, and the weldability deteriorates.

SUMMARY OF THE INVENTION

The present invention was developed in view of such problems and its object is to provide a flux-cored wire for stainless steel arc welding which is excellent in the weldability in welding in all attitudes and can obtain a weld bead more excellent in the low temperature toughness while keeping excellent pitting corrosion resistance in arc welding of duplex stainless steel and the like.

The flux-cored wire for stainless steel arc welding in relation with the present invention is a flux-cored wire for stainless steel arc welding including an outer sheath made of stainless steel and flux filled up in the outer sheath, containing, as percentage to the total mass of the wire, Cr: 22.0-30.0 mass %, Ni: 6.0-12.0 mass %, Mo: 2.0-5.0 mass %, N: 0.20-0.35 mass %, $TiO_2$: 4.0-9.0 mass %, $SiO_2$: 0.1-2.0 mass %, $ZrO_2$: 0.5-4.0 mass %, total of $Li_2O$, $Na_2O$ and $K_2O$: 0.50-1.50 mass %, metal fluoride in terms of fluorine amount: 0.10-0.90 mass %, and rare earth element component: 0.10-1.00 mass %, limiting, as percentage to the total mass of the wire, to C: 0.04 mass % or below, W: 4.0 mass % or below, Cu: 2.0 mass % or below, and $Bi_2O_3$: 0.01 mass % or below, and limiting, as percentage to the total mass of the wire, the total content of oxides other than above-mentioned $Bi_2O_3$, $TiO_2$, $SiO_2$, $ZrO_2$, $Li_2O$, $Na_2O$ and $K_2O$ to 3.0 mass % or below.

In the flux-cored wire for stainless steel arc welding in relation with the present invention, N, Cr and Mo are contained by a proper range of amount, the $Bi_2O_3$ content in the wire is limited, rare earth element composition is added to the wire by a proper amount, and therefore more excellent low temperature toughness can be obtained in the weld bead of duplex stainless steel and the like while keeping excellent pitting corrosion resistance. Also, because a slag forming agent and an arc stabilizer are contained by a proper range of amount and the content of oxides other than the required compositions are limited, excellent slag encapsulating performance can be secured and the weldability is also excellent.

DESCRIPTION OF THE PREFERRED EMBODIMENTS

Figure 1A:
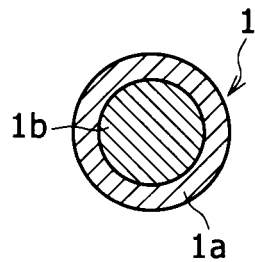
FIGS. 1A to 1D are drawings showing an example of a flux-cored wire.

Embodiments according to an aspect of the present invention will be specifically described below. Conventionally, in order to secure high pitting corrosion resistance in the weld bead of duplex stainless steel and the like, N, Cr and Mo have been added as a composition of the flux-cored wire. However, addition of N in a large amount becomes a cause of generating welding defects such as pits and gas grooves in the weld and the low temperature toughness of the weld bead comes to be easily deteriorated. The structural material with deteriorated low temperature toughness cannot be used in a high pressure and low temperature environment such as the submarine trench, seabed or the like for example. In order to solve the problems of generation of the welding defects and deterioration of the low temperature toughness of the weld bead by addition of N to a flux-cored wire, the present inventors carried out intensive experiments and studies. As a result, it was known that, excellent low temperature toughness of the weld bead of duplex stainless steel and the like could be secured while keeping the pitting corrosion resistance of same with and higher level than that of the conventional one by adding a rare earth element component to a flux-cored wire by a proper amount while limiting the $Bi_2O_3$ content in the flux-cored wire which is added with N, Cr and Mo.

Further, the present inventors came to know that, when $TiO_2$, $SiO_2$ and $ZrO_2$ as a slag forming agent, $Li_2O$, $Na_2O$ and $K_2O$ as an arc stabilizer, and fluorine as a metal fluoride were added by a proper range of amount to the flux-cored wire and the content of oxides other than the required compositions were limited, excellent slag encapsulating performance could be secured, thereby the slag removability and the porosity resistance were excellent, and the excellent weldability could be secured.

The present invention can be applied to welding with the weld metal of stainless steel such as duplex stainless steel and the like for example, and, in addition, can be suitably applied to, for example, a case where deposit-welding is performed on top of the base metal of mild steel.

The reasons of limiting the value with respect to the flux-cored wire for stainless steel arc welding according to an aspect of the present invention will be described below.

[Cr: 22.0-30.0 Mass % Per Total Mass of Wire]

Cr has an action of improving the pitting corrosion resistance of the weld bead. When the Cr content is below 22.0 mass % per the total mass of the wire, the pitting corrosion resistance of the weld bead cannot be improved sufficiently. On the other hand, when the Cr content exceeds 30.0 mass % per the total mass of the wire, a σ-phase, which is an intermetallic compound mainly of FeCr, precipitates in the weld bead, and the low temperature toughness deteriorates (σ-phase embrittlement). Accordingly, the Cr content is stipulated as 22.0-30.0 mass % per the total mass of the wire in the present invention.

[Ni: 6.0-12.0 Mass % Per Total Mass of Wire]

Ni has actions of stabilizing an austenitic phase and improving the low temperature toughness of the deposited metal in the weld bead of duplex stainless steel and the like. When the Ni content is below 6.0 mass % per the total mass of the wire, the action of improving the low temperature toughness of the deposited metal cannot be secured sufficiently. On the other hand, when the Ni content exceeds 12.0 mass % per the total mass of the wire, the ductility of the deposited metal is deteriorated. Accordingly, the Ni content is stipulated as 6.0-12.0 mass % per the total mass of the wire in the present invention.

[Mo: 2.0-5.0 Mass % Per Total Mass of Wire]

Similar to Cr, Mo is added with the aim of improving the pitting corrosion resistance of the weld bead. When the Mo content is below 2.0 mass % per the total mass of the wire, the pitting corrosion resistance of the weld bead cannot be improved sufficiently. On the other hand, when the Mo content exceeds 5.0 mass % per the total mass of the wire, a σ-phase, which is an intermetallic compound mainly of FeCr, precipitates in the weld bead of duplex stainless steel and the like, and the low temperature toughness of the deposited metal deteriorates (σ-phase embrittlement). Accordingly, the Mo content is stipulated as 2.0-5.0 mass % per the total mass of the wire in the present invention.

[N: 0.20-0.35 Mass % Per Total Mass of Wire]

Similar to Cr and Mo, N has an action of improving the pitting corrosion resistance of the weld bead. When the N content is below 0.20 mass % per the total mass of the wire, the pitting corrosion resistance of the weld bead cannot be improved sufficiently. On the other hand, when the N content exceeds 0.35 mass % per the total mass of the wire, the pitting corrosion resistance of the weld bead deteriorates, welding defects such as pits and gas grooves may be generated thereby, and the low temperature toughness of the deposited metal deteriorates. Accordingly, the N content is stipulated as 0.20-0.35 mass % per the total mass of the wire in the present invention.

[$TiO_2$: 4.0-9.0 Mass % Per Total Mass of Wire]

$TiO_2$ is a slag forming agent, improves flowability of the slag, and improves the encapsulating performance and the removability of the slag. Also $TiO_2$ has an action of improving the arc stability. When the $TiO_2$ content is below 4.0 mass % per the total mass of the wire, the effect of improving the slag encapsulating performance and the slag removability as well as the arc stability cannot be secured. On the other hand, when the $TiO_2$ content exceeds 9.0 mass % per the total mass of the wire, the flowability of the slag deteriorates and welding defects such as inclusion of the slag in the weld bead easily occur. Also, the slag removability and the porosity resistance in welding deteriorate. Accordingly, the $TiO_2$ content is stipulated as 4.0-9.0 mass % per the total mass of the wire in the present invention. Preferable lower limit value is 5.0 mass %, and preferable upper limit value is 8.0 mass %.

[$SiO_2$: 0.1-2.0 Mass % Per Total Mass of Wire]

$SiO_2$ has an action of improving the fitting performance of the bead and the encapsulating performance of the slag, and excellent slag removability and porosity resistance can be secured by adding $SiO_2$. When the $SiO_2$ content is below 0.1 mass % per the total mass of the wire, the effect of improving the fitting performance of the bead and the encapsulating performance of the slag cannot be secured sufficiently. On the other hand, when the $SiO_2$ content exceeds 2.0 mass % per the total mass of the wire, the slag is easily seized and the slag removability deteriorates. Accordingly, the $SiO_2$ content is stipulated as 0.1-2.0 mass % per the total mass of the wire in the present invention.

[$ZrO_2$: 0.5-4.0 Mass % Per Total Mass of Wire]

$ZrO_2$ has an action of improving the viscosity of the slag, and excellent slag encapsulating performance can be secured particularly in vertical welding and overhead welding by adding $ZrO_2$, and thereby excellent slag removability and porosity resistance can be secured. When the $ZrO_2$ content is below 0.5 mass % per the total mass of the wire, the effect of improving the viscosity of the slag cannot be secured sufficiently and the vertical upward weldability deteriorates. On the other hand, when the $ZrO_2$ content exceeds 4.0 mass % per the total mass of the wire, the viscosity of the slag becomes exceedingly high, the slag removability deteriorates, and welding defects such as inclusion of the slag in the weld bead easily occurs. Accordingly, the $ZrO_2$ content is stipulated as 0.5-4.0 mass % per the total mass of the wire in the present invention. Preferable lower limit value is 1.0 mass %.

[$Li_2O$, $Na_2O$ and $K_2O$: 0.50-1.50 Mass % Per Total Mass of Wire in Total]

Oxides of Li, Na and K which are alkaline metals have an action of improving the arc stability by adding the same, particularly improving the weldability in vertical upward welding. When the total content of $Li_2O$, $Na_2O$ and $K_2O$ is below 0.50 mass % per the total mass of the wire, excellent weldability cannot be secured in welding in all attitudes. On the other hand, when the total content of $Li_2O$, $Na_2O$ and $K_2O$ exceeds 1.50 mass % per the total mass of the wire, the moisture absorption resistance of the wire easily deteriorates. Accordingly, the total content of $Li_2O$, $Na_2O$ and $K_2O$ is stipulated as 0.50-1.50 mass % per the total mass of the wire in the present invention.

[Metal Fluoride: 0.10-0.90 Mass % Per Total Mass Of Wire in Terms of Fluorine Amount]

Fluorine has actions of suppressing generation of welding defects such as pits and blow holes in the weld bead and improving the porosity resistance, and is added in the form of metal fluoride in the present invention. When the metal fluoride content in terms of the fluorine amount is below 0.10 mass per the total mass of the wire, pits and blow hole s are easily generated, and the slag removability also deteriorates. On the other hand, when the metal fluoride content in terms of the fluorine amount exceeds 0.90 mass per the total mass of the wire, the arc stability in welding deteriorates, generated amount of spatters and fume increases, and the weldability deteriorates. Accordingly, the metal fluoride content in terms of the fluorine amount is stipulated as 0.10-0.90 mass % per the total mass of the wire in the present invention. Also, preferable metal fluoride content in terms of the fluorine amount is 0.30-0.90 mass % per the total mass of the wire.

[Rare Earth Element Composition: 0.10-1.00 Mass % Per Total Mass of Wire]

Rare earth element composition is the most important composition in the present invention in improving the low temperature toughness of the weld bead. That is, because the rare earth element composition is a strong deoxidizing agent, it reduces the oxygen amount in the deposited metal, the deposited metal comes to smoothly shift from a ferritic phase to an austenitic phase with an oxidized inclusion as a starting point, and, as a result, the rare earth element composition has an action of miniaturizing the structure of duplex stainless steel and the like and improving the low temperature toughness of the weld bead. Also the rare earth element composition has effects of leveling the covering of the slag and improving the slag removability, and has an action of preventing generation of welding defects such as gas grooves and pits generated by gas such as nitrogen gas staying in the boundary section between the deposited metal and the slag. The rare earth element composition can be added into the flux in the form of fluorides or oxides of Ce, La and Y for example. When the content of the rare earth element composition is 0.10 mass % or above per the total mass of the wire, the low temperature toughness of the weld bead can be improved. On the other hand, when the content of the rare earth element composition exceeds 1.00 mass % per the total mass of the wire, the slag removability comes to easily deteriorate adversely. This is supposed to be due to increase of oxides of the rare earth element in the slag. Accordingly, the content of the rare earth element composition is stipulated as 0.10-1.00 mass % per the total mass of the wire in the present invention. Also, by making the content of the rare earth element composition 0.30 mass % or above per the total mass of the wire, the effects described above can be secured sufficiently.

[C: Limited to 0.04 Mass % or Below Per Total Mass of Wire]

C reacts with Cr and Mo to form carbide and deteriorates the pitting corrosion resistance of the weld bead. When the C content exceeds 0.04 mass % per the total mass of the wire, the pitting corrosion resistance of the weld bead deteriorates. Accordingly, the C content is limited to 0.04 mass % or below per the total mass of the wire in the present invention.

[W: Limited to 4.0 Mass % or Below Per Total Mass of Wire]

When such large amount of W that the W content in the wire exceeds 4.0 mass % per the total mass of the wire is added, nitride and intermetallic compound precipitate in the weld bead of duplex stainless steel and the like, and the brittleness and the low temperature toughness of the deposited metal deteriorate. Accordingly, the W content is limited to 4.0 mass % or below per the total mass of the wire in the present invention. Also, preferable W content is 2.0 mass % or below per the total mass of the wire.

[Cu: Limited to 2.0 Mass % or Below Per Total Mass of Wire]

Even if the added amount is minute, Cu deteriorates the slag removability. Also, when such large amount of Cu that the Cu content exceeds 2.0 mass per the total mass of the wire is added, the slag removability deteriorates and the porosity resistance also deteriorates. Accordingly, the Cu content is limited to 2.0 mass % or below per the total mass of the wire in the present invention. Also, preferable Cu content is 1.0 mass or below per the total mass of the wire.

[$Bi_2O_3$: Limited to 0.01 Mass % or Below Per Total Mass of Wire]

$Bi_2O_3$ increases the oxygen amount in the deposited metal and deteriorates the low temperature toughness of the weld bead. When the $Bi_2O_3$ content exceeds 0.01 mass per the total mass of the wire, the low temperature toughness of the weld bead deteriorates. Accordingly, the $Bi_2O_3$ content is limited to 0.01 mass % or below per the total mass of the wire in the present invention. Also, preferable $Bi_2O_3$ content is 0.005 mass % or below per the total mass of the wire.

[Oxides Other than Above: Limited to 3.0 Mass % or Below Per Total Mass of Wire]

Oxides other than the above-mentioned $Bi_2O_3$, $TiO_2$, $SiO_2$, $ZrO_2$, $Li_2O$, $Na_2O$ and $K_2O$ deteriorate the characteristics of the slag such as the slag removability and the porosity resistance for example, and deteriorate the weldability. When the content of oxides other than $Bi_2O_3$, $TiO_2$, $SiO_2$, $ZrO_2$, $Li_2O$, $Na_2O$ and $K_2O$ exceeds 3.0 mass % per the total mass of the wire, the slag removability deteriorates and the porosity resistance also deteriorates. Accordingly, the content of oxides other than $Bi_2O_3$, $TiO_2$, $SiO_2$, $ZrO_2$, $Li_2O$, $Na_2O$ and $K_2O$ is limited to 3.0 mass % or below per the total mass of the wire in the present invention. Also, preferable content of oxides other than $Bi_2O_3$, $TiO_2$, $SiO_2$, $ZrO_2$, $Li_2O$, $Na_2O$ and $K_2O$ is 1.2 mass % or below per the total mass of the wire.

In the present invention, in addition to the value range of the wire composition described above, it is preferable to make the flux ratio, which is the ratio of the mass of the flux to the total mass of the wire, 25.0-40.0 mass %. When the flux ratio is below 25.0 mass %, there are cases that welding defects such as inclusion of the slag easily occur, whereas when the flux ratio exceeds 40.0 mass %, the feeding performance easily deteriorates due to lowering of the strength of the wire, and there are cases that stable welding work cannot be performed. Accordingly, the flux ratio is preferable to be 25.0-40.0 mass % and is more preferable to be 30.0-38.0 mass %.

Also, in the present invention, from the viewpoint of productivity, for the outer sheath of the flux-cored wire, it is preferable to use stainless steel containing Cr: 16.0-22.0 mass %, Ni: 10.0-14.0 mass % and Mo: 2.0-3.0 mass % per the total mass of the outer sheath. When the stainless steel with the composition other than the above is used for the outer sheath, there are cases that the productivity lowers and the cost easily increases.

EXAMPLES

Figure 1B:
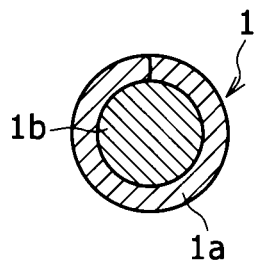
Figure 1C:
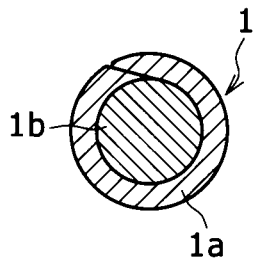
Figure 1D:
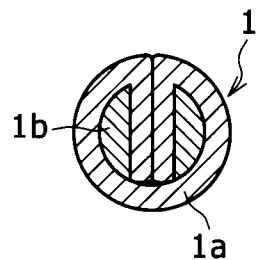

Below, the examples satisfying the range stipulated in the present invention will be described by comparing their effect with those of the comparative examples that deviate from the range stipulated in the present invention. First, while a strip with 0.4 mm thickness and 9.0 mm width made of stainless steel with the composition shown in Table 1 was moved in the longitudinal direction, flux was supplied thereon, then the strip was gradually bent in the width direction to be formed into a cylindrical shape shown in FIG. 1B, and thereby the flux 1b composed of metal material and slag composition was filled up in an outer sheath 1a (Nos. A and B). A flux-cored wire 1 (Nos. 1-24) obtained was subjected to drawing work so that the diameter became 1.2 mm, and was made a sample wire. At the time, by adjusting the filling factor of the flux with respect to the outer sheath and the composition of the flux, flux-cored wires of respective examples and comparative examples having the composition shown in Table 2-1 and Table 2-2 were manufactured.

TABLE 1

| Outer sheath No. | Outer sheath composition (mass %) | | | | | | | | | | |
|---|---|---|---|---|---|---|---|---|---|---|---|
| | C | Si | Mn | P | S | Ni | Cr | Mo | Cu | N | Fe and inevitable impurities |
| A | 0.01 | 0.29 | 1.15 | 0.013 | 0.001 | 9.6 | 19.0 | 0.01 | 0.02 | 0.01 | Remainder |
| B | 0.02 | 0.45 | 1.25 | 0.022 | 0.001 | 12.1 | 17.6 | 2.28 | 0.07 | 0.01 | Remainder |

TABLE 2-1

| | Wire No. | Outer sheath (No. in Table 1) | Flux filling factor | Wire composition (mass %) | | | | | |
|---|---|---|---|---|---|---|---|---|---|
| | | | | C | Ni | Cr | Mo | Cu | W | N |
| Example | 1 | A | 34 | 0.02 | 6.6 | 28.8 | 3.3 | 1.7 | 0.2 | 0.23 |
| | 2 | B | 27 | 0.02 | 8.8 | 22.8 | 4.6 | 0.6 | 3.7 | 0.24 |
| | 3 | A | 33 | 0.02 | 7.2 | 29.1 | 3.5 | 0.1 | 2.5 | 0.24 |
| | 4 | A | 33 | 0.03 | 8.5 | 25.2 | 2.8 | 0.8 | 2.5 | 0.33 |
| | 5 | A | 34 | 0.02 | 11.2 | 24.5 | 3.5 | 1.8 | ≦0.01 | 0.23 |
| | 6 | B | 42 | 0.02 | 9.3 | 24.0 | 3.1 | 1.1 | 0.1 | 0.23 |
| | 7 | B | 34 | 0.02 | 10.5 | 24.1 | 3.3 | 0.1 | ≦0.01 | 0.23 |
| | 8 | A | 33 | 0.02 | 7.9 | 22.4 | 3.5 | 0.1 | 2.5 | 0.24 |
| | 9 | A | 33 | 0.03 | 8.5 | 25.2 | 2.1 | 0.8 | 2.5 | 0.28 |
| Comparative example | 10 | A | 28 | 0.06 | 6.6 | 28.9 | 2.6 | 0.1 | 3.8 | 0.24 |
| | 11 | A | 33 | 0.03 | 5.1 | 23.5 | 3.4 | 0.1 | ≦0.01 | 0.25 |
| | 12 | A | 33 | 0.02 | 7.6 | 23.5 | 3.5 | 2.5 | ≦0.01 | 0.25 |
| | 13 | A | 33 | 0.02 | 8.4 | 24.2 | 4.6 | 0.1 | ≦0.01 | 0.23 |
| | 14 | B | 27 | 0.02 | 8.4 | 26.7 | 1.8 | 0.8 | 1.1 | 0.23 |
| | 15 | A | 34 | 0.02 | 6.4 | 27.6 | 3.0 | 0.1 | 1.3 | 0.37 |
| | 16 | B | 33 | 0.02 | 10.5 | 24.2 | 3.1 | 0.1 | 0.4 | 0.24 |
| | 17 | B | 27 | 0.02 | 10.2 | 31.4 | 3.3 | 0.1 | 1.8 | 0.23 |
| | 18 | A | 33 | 0.02 | 8.8 | 23.8 | 3.5 | 0.1 | ≦0.01 | 0.23 |
| | 19 | A | 33 | 0.03 | 8.7 | 21.5 | 4.8 | 1.8 | 3.1 | 0.23 |
| | 20 | A | 27 | 0.02 | 7.2 | 22.4 | 4.4 | 0.4 | 4.2 | 0.22 |
| | 21 | A | 33 | 0.02 | 8.3 | 24.3 | 3.1 | 1.1 | ≦0.01 | 0.23 |
| | 22 | A | 33 | 0.02 | 9.7 | 25.6 | 5.5 | 1.2 | 2.3 | 0.21 |
| | 23 | B | 27 | 0.02 | 11.1 | 23.7 | 3.0 | 0.1 | 2.2 | 0.11 |
| | 24 | A | 28 | 0.02 | 8.2 | 24.9 | 2.3 | 0.5 | 1.8 | 0.26 |

TABLE 2-2

| | Wire No. | Wire composition (mass %) | | | | | | | |
|---|---|---|---|---|---|---|---|---|---|
| | | $Bi_2O_3$ | $TiO_2$ | $SiO_2$ | $ZrO_2$ | Other oxides | Total of $Li_2O$, $Na_2O$, $K_2O$ | Metal fluoride (in terms of fluorine amount) | Rare earth element composition |
| Example | 1 | ≦0.010 | 6.9 | 1.2 | 2.0 | 1.8 | 0.92 | 0.45 | 0.36 |
| | 2 | ≦0.010 | 6.5 | 0.4 | 3.7 | 0.8 | 0.78 | 0.39 | 0.95 |
| | 3 | ≦0.010 | 4.8 | 0.8 | 0.9 | ≦0.1 | 0.98 | 0.49 | 0.21 |
| | 4 | ≦0.010 | 4.3 | 0.3 | 1.8 | 1.0 | 1.00 | 0.55 | 0.82 |

TABLE 2-2-continued

| | Wire No. | Bi₂O₃ | TiO₂ | SiO₂ | ZrO₂ | Other oxides | Total of Li₂O, Na₂O, K₂O | Metal fluoride (in terms of fluorine amount) | Rare earth element composition |
|---|---|---|---|---|---|---|---|---|---|
| | | | | | Wire composition (mass %) | | | | |
| | 5 | ≦0.010 | 6.9 | 0.6 | 2.4 | 0.6 | 0.91 | 0.44 | 0.51 |
| | 6 | ≦0.010 | 5.9 | 0.2 | 1.7 | 2.8 | 0.66 | 0.32 | 0.77 |
| | 7 | ≦0.010 | 8.7 | 0.5 | 2.4 | ≦0.1 | 0.85 | 0.39 | 0.44 |
| | 8 | ≦0.010 | 6.6 | 1.0 | 3.4 | 0.2 | 1.23 | 0.49 | 0.17 |
| | 9 | ≦0.010 | 5.6 | 1.6 | 2.2 | ≦0.1 | 1.34 | 0.55 | 0.12 |
| Comparative example | 10 | ≦0.010 | 3.7 | 0.9 | 3.4 | ≦0.1 | 0.92 | 0.44 | 0.48 |
| | 11 | ≦0.010 | 7.4 | 0.0 | 2.1 | 0.1 | 0.89 | 0.31 | 0.21 |
| | 12 | ≦0.010 | 6.5 | 0.9 | 1.8 | ≦0.1 | 0.85 | 0.32 | 0.12 |
| | 13 | 0.021 | 4.4 | 2.2 | 1.8 | 2.1 | 1.04 | 0.52 | 0.21 |
| | 14 | ≦0.010 | 7.2 | 1.1 | 2.1 | 3.4 | 0.88 | 0.42 | 0.18 |
| | 15 | ≦0.010 | 9.2 | 0.4 | 1.9 | 0.3 | 0.76 | 0.39 | 0.45 |
| | 16 | ≦0.010 | 7.4 | 1.5 | 2.1 | 1.5 | 0.95 | 0.46 | 1.15 |
| | 17 | ≦0.010 | 7.2 | 1.8 | 0.3 | 1.2 | 0.93 | 0.45 | 0.69 |
| | 18 | ≦0.010 | 5.5 | 0.3 | 4.3 | ≦0.1 | 0.41 | 0.34 | 0.77 |
| | 19 | ≦0.010 | 7.5 | 0.9 | 2.1 | 2.1 | 1.21 | 1.10 | 0.88 |
| | 20 | ≦0.010 | 6.9 | 0.4 | 2.0 | 2.0 | 0.58 | 0.28 | 0.42 |
| | 21 | ≦0.010 | 6.8 | 0.3 | 2.0 | ≦0.1 | 0.72 | 0.34 | 0.00 |
| | 22 | ≦0.010 | 7.2 | 1.0 | 1.2 | ≦0.1 | 0.58 | 0.05 | 0.18 |
| | 23 | ≦0.010 | 7.2 | 1.1 | 1.9 | ≦0.1 | 1.68 | 0.38 | 0.45 |
| | 24 | ≦0.010 | 9.4 | 1.0 | 2.7 | 0.7 | 0.55 | 0.27 | 0.33 |

Figure 2A:
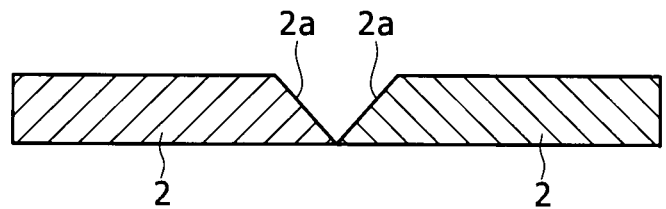
FIG. 2A is a cross-sectional drawing showing a groove shape of a welding base metal in flat welding.
Figure 2B:
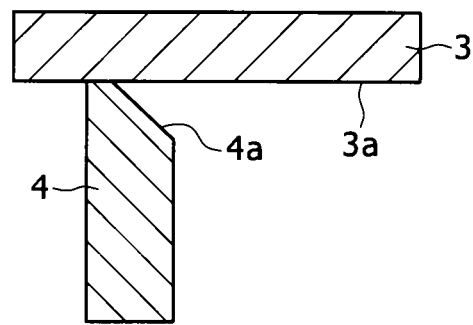
FIG. 2B is a cross-sectional drawing showing a groove shape of a welding base metal in vertical welding and overhead welding.

Using Nos. 1-24 flux-cored wires for stainless steel arc welding 1 manufactured by the method described above, flat welding, vertical welding and overhead welding were performed for the welding base metal having the chemical composition shown in Table 3, and the weldability was evaluated. FIG. 2A is a cross-sectional drawing showing a groove shape of a welding base metal in flat welding, and FIG. 2B is a cross-sectional drawing showing a groove shape of a welding base metal in vertical welding and overhead welding. As shown in FIG. 2A, slopes 2a were shaped at the ends of the welding base metal 2, and were arranged to make the slopes 2a of the welding base metal 2 face with each other, and flat welding was performed. Also, as shown in FIG. 2B, the end on a slope 4a side shaped in a welding base metal 4 was made to abut upon a side face 3a of an upper plate 3, and vertical welding and overhead welding were performed. The welding conditions at that time are shown in Table 4 below. With respect to the flux-cored wire of each example and comparative example, the weldability was evaluated by the arc stability in flat welding, vertical welding and overhead welding, the slag removability and the porosity resistance. Also, with respect to vertical welding, the vertical upward weldability was also evaluated. With respect to the weldability for the flux-cored wires of respective examples and comparative examples, very excellent case was evaluated as "⊚", excellent case was evaluated as "○" the case not passed was evaluated as "x", and they are shown in Table 5 below.

TABLE 3

| Welding base metal (mass %) | | | | | | | | | | |
|---|---|---|---|---|---|---|---|---|---|---|
| C | Si | Mn | P | S | Cu | Ni | Cr | Mo | N | Fe and inevitable impurities |
| 0.019 | 0.38 | 0.70 | 0.02 | 0.001 | 0.05 | 7.0 | 25.6 | 3.8 | 0.28 | Remainder |

TABLE 4

| | Welding condition | | |
|---|---|---|---|
| Welding attitude | Flat welding | Vertical welding | Overhead welding |
| Electrode manipulation | Weaving | Weaving | Straight |
| Welding current (A) | 180-250 | 140-180 | 140-180 |
| Arc voltage (V) | 27-34 | 25-27 | 25-27 |
| Welding speed (cm/min) | 25-30 | 5-10 | 25-30 |
| Welding heat input (kJ/cm) | 10.3-15.6 | 14.5-24.0 | 8.0-10.5 |
| Polarity | D.C./wire plus | D.C./wire plus | D.C./wire plus |
| Shielding gas | 80% Ar—20% CO₂ | 80% Ar—20% CO₂ | 80% Ar—20% CO₂ |
| Wire protrusion length (mm) | 20 | 20 | 20 |

Next, specimens were taken in accordance with ASTM G48E method from the deposited metal welded by flat welding, a pitting corrosion test was conducted for the specimens, CPT (Critical Pitting Temperature) was measured, and thereby the pitting corrosion resistance was evaluated. In terms of CPT, one 40° C. or above was evaluated as "⊚", one exceeding 35° C. and below 40° C. was evaluated as "○", one 35° C. or below was evaluated as "x". With respect to the deposited metal welded using the flux-cored wire of each example and comparative example, the evaluation result of the pitting corrosion resistance is also shown in Table 5.

Also, Charpy impact tests were performed 3 times at −40° C. temperature in accordance with JIS Z 3128 for the same deposited metal welded by flat welding for each example and comparative example, and the notch toughness in the low temperature atmosphere was evaluated by the average value of absorbed energy measured. Further, in terms of the average of the absorbed energy value measured in Charpy tests in 3 times, one 35 J or above was evaluated as "⊚", and one below 35J was evaluated as "x".

Furthermore, as the comprehensive evaluation, the case in which all items of the weldability (arc stability, slag removability, vertical upward weldability, and porosity resistance) and the deposited metal characteristics (pitting corrosion resistance and low temperature toughness) had been evaluated as "⊚" was evaluated as "⊚", the case in which any one item had been evaluated as "x" was evaluated as "x", and the case in which the evaluation had been either "⊚" or "○" was evaluated as "○".

pared with the comparative examples No. 10-No. 24 whose composition of the flux-cored wire did not satisfy the range stipulated in the present invention.

With regard to the comparative example No. 10, the C content in the wire exceeded the range stipulated in the present invention, the pitting corrosion resistance of the deposited metal deteriorated, and the slag removability deteriorated due to insufficiency of $TiO_2$. With regard to the comparative example No. 11, the Ni content in the wire was below the range stipulated in the present invention, the low temperature toughness of the deposited metal deteriorated, and the slag removability deteriorated due to insufficiency of $SiO_2$. With regard to the comparative example No. 12, the Cu content in the wire exceeded the range stipulated in the present invention, the slag removability during the welding work deteriorated, and the porosity resistance also deteriorated.

With regard to the comparative example No. 13, the $Bi_2O_3$ content in the wire exceeded the range stipulated in the present invention, the low temperature toughness of the deposited metal deteriorated, the $SiO_2$ content became excessive, and the slag removability deteriorated. With regard to the comparative example No. 14, the pitting corrosion resistance of the deposited metal could not be improved due to insufficiency of Mo in the wire, oxides other than $Bi_2O_3$, $TiO_2$, $SiO_2$, $ZrO_2$, $Li_2O$, $Na_2O$ and $K_2O$ became excessive, the slag removability during welding deteriorated, and the porosity resistance also deteriorated.

With regard to the comparative example No. 15, the content of N and $TiO_2$ in the wire exceeded the range stipulated in

TABLE 5

| Wire No. | | Deposited metal characteristics | | | | Weldability evaluation | | | | Comprehensive evaluation |
|---|---|---|---|---|---|---|---|---|---|---|
| | | Charpy impact test result (−40° C.) | | Pitting corrosion resistance | | | | | | |
| | | Absorbed energy average (J) | Evaluation | CPT (° C.) | Evaluation | Arc stability | Slag removability | Vertical upward weldability | Porosity resistance | |
| Example | 1 | 40 | ⊚ | 40 | ⊚ | ⊚ | ⊚ | ⊚ | ⊚ | ⊚ |
| | 2 | 45 | ⊚ | 40 | ⊚ | ⊚ | ⊚ | ⊚ | ⊚ | ⊚ |
| | 3 | 50 | ⊚ | 40 | ⊚ | ⊚ | ⊚ | ⊚ | ⊚ | ⊚ |
| | 4 | 37 | ⊚ | 40 | ⊚ | ⊚ | ⊚ | ⊚ | ⊚ | ⊚ |
| | 5 | 39 | ⊚ | 40 | ⊚ | ⊚ | ⊚ | ⊚ | ⊚ | ⊚ |
| | 6 | 37 | ⊚ | 40 | ⊚ | ○ | ⊚ | ⊚ | ⊚ | ○ |
| | 7 | 41 | ⊚ | 40 | ⊚ | ⊚ | ⊚ | ⊚ | ⊚ | ⊚ |
| | 8 | 50 | ⊚ | 40 | ⊚ | ⊚ | ⊚ | ⊚ | ⊚ | ⊚ |
| | 9 | 37 | ⊚ | 40 | ⊚ | ⊚ | ⊚ | ⊚ | ⊚ | ⊚ |
| Comparative example | 10 | 38 | ⊚ | 30 | X | ⊚ | X | ⊚ | ⊚ | X |
| | 11 | 27 | X | 40 | ⊚ | ⊚ | X | ⊚ | ⊚ | X |
| | 12 | 36 | ⊚ | 40 | ⊚ | ⊚ | X | ⊚ | X | X |
| | 13 | 16 | X | 40 | ⊚ | ⊚ | X | ⊚ | ⊚ | X |
| | 14 | 40 | ⊚ | 30 | X | ⊚ | X | ⊚ | X | X |
| | 15 | 32 | X | 40 | ⊚ | ⊚ | X | ⊚ | X | X |
| | 16 | 37 | ⊚ | 40 | ⊚ | ⊚ | X | ⊚ | ⊚ | X |
| | 17 | 31 | X | 40 | ⊚ | ⊚ | X | X | ⊚ | X |
| | 18 | 35 | ⊚ | 40 | ⊚ | X | X | ○ | ⊚ | X |
| | 19 | 38 | ⊚ | 30 | X | X | ⊚ | ⊚ | ⊚ | X |
| | 20 | 29 | X | 40 | ⊚ | ⊚ | ⊚ | ⊚ | ⊚ | X |
| | 21 | 32 | X | 40 | ⊚ | ⊚ | ○ | ⊚ | X | X |
| | 22 | 30 | X | 40 | ⊚ | ○ | X | ⊚ | X | X |
| | 23 | 46 | ⊚ | 30 | X | X | ⊚ | ⊚ | ⊚ | X |
| | 24 | 39 | ⊚ | 40 | ⊚ | ⊚ | X | ⊚ | X | X |

As shown in Table 5, with regard to the examples No. 1-No. 9, because the composition of the flux-cored wire satisfied the range stipulated in the present invention, the weldability and the characteristics of the deposited metal were excellent compared with the comparative examples No. 10-No. 24 whose the present invention, the porosity resistance of the weld bead deteriorated, $TiO_2$ became excessive, the slag removability also deteriorated, N became excessive, and the low temperature toughness deteriorated. On the other hand, with regard to the comparative example No. 24, the TiO$_2$ content in the wire exceeded the range stipulated in the present invention, and the porosity resistance of the weld bead and the slag removability deteriorated, however the N content in the wire satisfied the range stipulated in the present invention, and the low temperature toughness of the deposited metal was excellent.

With regard to the comparative example No. 16, the content of the rare earth element component in the wire exceeded the range stipulated in the present invention, and the slag removability deteriorated. This is probably because the oxide in the rare earth element increases in the slag. With regard to the comparative example No. 17, the Cr content in the wire exceeded the range stipulated in the present invention, the low temperature toughness deteriorated, and the slag removability and the vertical upward weldability deteriorated due to insufficiency of ZrO$_2$.

With regard to the comparative example No. 18, the total amount of Li$_2$O, Na$_2$O and K$_2$O in the wire was below the range stipulated in the present invention, sufficient arc stability could not be obtained, and the vertical upward weldability slightly deteriorated. Also, the ZrO$_2$ content became excessive, the viscosity of the slag became high, and the slag removability deteriorated. With regard to the comparative example No. 19, the Cr content in the wire was below the range stipulated in the present invention, the pitting corrosion resistance deteriorated, and the arc stability deteriorated due to excessive metal fluoride. With regard to the comparative example No. 20, the W content in the wire exceeded the range stipulated in the present invention, and the low temperature toughness of the deposited metal deteriorated.

With regard to the comparative example No. 21, due to insufficiency of the rare earth element component in the wire, the low temperature toughness of the deposited metal could not be improved, and the porosity resistance also deteriorated. With regard to the comparative example No. 22, the Mo content in the wire exceeded the range stipulated in the present invention, and the low temperature toughness of the deposited metal deteriorated. Also, the content of the metal fluoride in the wire was below the range stipulated in the present invention, and the slag removability and the porosity resistance deteriorated. With regard to the comparative example No. 23, the N content in the wire was below the range stipulated in the present invention, and the pitting corrosion resistance of the deposited metal deteriorated. Further, due to insufficiency of Li$_2$O, Na$_2$O and K$_2$O, the arc stability could not be improved sufficiently.

What is claimed is:

1. A flux-cored wire, comprising an outer sheath made of stainless steel and a flux filled into the outer sheath,
    wherein the wire has a composition comprising, as percentage to a total mass of the wire:
    Cr in an amount of from 22.0 to 30.0 mass %,
    Ni in an amount of from 6.0 to 12.0 mass %,
    Mo in an amount of from 2.0 to 5.0 mass %,
    N in an amount of from 0.20 to 0.35 mass %,
    TiO$_2$ in an amount of from 4.0 to 9.0 mass %,
    SiO$_2$ in an amount of from 0.1 to 2.0 mass %,
    ZrO$_2$ in an amount of from 0.5 to 4.0 mass %,
    at least one of Li$_2$O, Na$_2$O and K$_2$O wherein the total amount of Li$_2$O, Na$_2$O and K$_2$O is in a range of larger than 0.50 mass % and 1.50 mass % or less,
    a metal fluoride comprising a fluorine amount of from 0.10 to 0.90 mass %,
    a rare earth element composition in an amount of from 0.10 to 1.00 mass %,
    C in an amount of 0.04 mass % or below,
    W in an amount of 4.0 mass % or below,
    Cu in an amount of 2.0 mass % or below,
    Bi$_2$O$_3$ in an amount of 0.01 mass % or below, and
    oxides other than the Bi$_2$O$_3$, TiO$_2$, SiO$_2$, ZrO$_2$, Li$_2$O, Na$_2$O and K$_2$O in an amount of 3.0 mass % or below.

2. The flux-cored wire according to claim 1, wherein the outer sheath has a composition comprising, per the total mass of the outer sheath,
    Cr in an amount of from 16.0 to 22.0 mass %,
    Ni in an amount of from 10.0 to 14.0 mass %,
    Mo in an amount of from 2.0 to 3.0 mass %,
    Fe and inevitable impurities.

3. The flux-cored wire according to claim 1, wherein the wire has a composition comprising TiO$_2$ in an amount of from 5.0 to 8.0 mass %.

4. The flux-cored wire according to claim 1, wherein the wire has a composition comprising fluorine in an amount of from 0.30 to 0.90 mass %.

5. The flux-cored wire according to claim 1, wherein a mass of the flux is in a range of from 25.0 to 40.0 mass % as percentage to the total mass of the wire.

6. The flux-cored wire according to claim 1, wherein a mass of the flux is in a range of from 30.0 to 38.0 mass % as percentage to the total mass of the wire.

7. The flux-cored wire according to claim 1, wherein the wire composition comprises oxides other than the Bi$_2$O$_3$, TiO$_2$, SiO$_2$, ZrO$_2$, Li$_2$O, Na$_2$O and K$_2$O in an amount of 1.2 mass % or below.

8. The flux-cored wire according to claim 1, wherein the wire has a composition comprising W in an amount of 2.0 mass % or below.

9. The flux-cored wire according to claim 1, wherein the wire has a composition comprising Cu in an amount of 1.0 mass % or below.

10. The flux-cored wire according to claim 1, wherein the wire has a composition comprising Bi$_2$O$_3$ in an amount of 0.005 mass % or below.

* * * * *